(12) United States Patent
Friedrich et al.

(10) Patent No.: US 11,943,315 B2
(45) Date of Patent: *Mar. 26, 2024

(54) STORAGE EFFICIENT CONTENT REVALIDATION FOR MULTIMEDIA ASSETS

(71) Applicant: Disney Enterprises, Inc., Burbank, CA (US)

(72) Inventors: Eric C. Friedrich, North Easton, MA (US); Eric R. Klein, Astoria, NY (US); Jeffrey Edwin Grubb, South Amboy, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,705

(22) Filed: Jan. 20, 2023

(65) Prior Publication Data

US 2023/0164238 A1 May 25, 2023

Related U.S. Application Data

(63) Continuation of application No. 17/093,226, filed on Nov. 9, 2020, now Pat. No. 11,563,824.

(51) Int. Cl.
| | | |
|---|---|---|
| *H04L 67/568* | (2022.01) | |
| *G06F 12/0802* | (2016.01) | |
| *G06F 16/41* | (2019.01) | |
| *G06F 16/48* | (2019.01) | |
| *G06F 16/957* | (2019.01) | |
| *H04L 67/02* | (2022.01) | |

(52) U.S. Cl.
CPC ........ *H04L 67/568* (2022.05); *G06F 12/0802* (2013.01); *G06F 16/41* (2019.01); *G06F 16/48* (2019.01); *G06F 16/9574* (2019.01); *H04L 67/02* (2013.01); *G06F 2212/154* (2013.01)

(58) Field of Classification Search
CPC ... H04L 67/568; H04L 67/02; G06F 12/0802; G06F 16/41; G06F 16/48; G06F 16/9574; G06F 2212/154
See application file for complete search history.

(56) References Cited

U.S. PATENT DOCUMENTS

| | | | | |
|---|---|---|---|---|
| 9,426,244 | B2 * | 8/2016 | Wang | H04L 67/561 |
| 11,641,337 | B2 * | 5/2023 | Flack | H04L 67/10 |
| | | | | 709/223 |
| 2011/0055386 | A1 * | 3/2011 | Middleton | H04L 67/125 |
| | | | | 709/224 |

(Continued)

*Primary Examiner* — Kristie D Shingles
(74) *Attorney, Agent, or Firm* — Patterson + Sheridan, LLP

(57) ABSTRACT

Techniques relating to caching a content object are disclosed. These techniques include receiving, at a first server from a requestor, a revalidation request relating to a content object. The techniques further include determining that metadata describing one or more characteristics of the content object is stored in a cache associated with the first server and that the content object is not stored in the cache, and in response to: determining, at the first server, whether to retrieve content object data from any server based on analyzing a metric relating to retrieving the content object, and transmitting from the first server to the requestor, based on analyzing the metadata, a response to the revalidation request indicating that the content object is not modified.

20 Claims, 5 Drawing Sheets

(56) References Cited

U.S. PATENT DOCUMENTS

2011/0060812 A1\* 3/2011 Middleton .......... G06F 16/9574
  709/219
2020/0358871 A1\* 11/2020 Goel .................... H04L 67/564

\* cited by examiner

STORAGE EFFICIENT CONTENT REVALIDATION FOR MULTIMEDIA ASSETS

CROSS-REFERENCE TO RELATED APPLICATIONS

This application is a continuation of co-pending U.S. patent application Ser. No. 17/093,226, filed Nov. 9, 2020, which is herein incorporated by reference in its entirety.

BACKGROUND

Content libraries for modern media streaming services can be extremely large. For example, a content library may be larger than the storage capacity of a single cache cluster. In this circumstance, the cache cluster can keep a selected portion of the content library assets in cache. Choosing what content to store in cache, and what to evict, is a challenging problem. A poorly designed cache system can lead to voluminous cache requests (e.g., network requests to a networked cache), which can be highly inefficient and swamp computing and network resources.

For example, a content delivery network (CDN) can include multiple levels of caching. One or more origin servers (also referred to as "origins" or "origin" herein) can be located at the center of a network and can maintain complete copies of the content library. One or more CDNs can be located at the network edge, in communication with users, and can include a cache that services a large percentage of requests from users (e.g., for the most popular content). One or more mid-tier servers, located in the middle between the origin server and the CDNs, can include additional caching to service most of the remaining requests from users (e.g., for less popular but still somewhat popular content).

CDNs can be instructed to perform frequent revalidation requests (e.g., requests to ensure that cached content has not changed or expired) on content objects (e.g. segments of streaming media) cached at the CDNs. These requests can be transmitted by the CDNs to the mid-tier servers, which can respond to the revalidation requests. Many successful revalidation requests from CDNs to mid-tier servers will eventually result in a zero length body response. This might occur, for example, where the content at the origin (and at the mid-tier) has not changed from the version maintained in the CDN cache.

Revalidation requests to the mid-tier can result in a cache miss in the mid-tier, because the content cached in the mid-tier has timed out and been deleted or replaced. The mid-tier server fulfills the request by retrieving the relevant content from the origin, and determining whether the content has changed. For content that has not changed, these cache misses on revalidation requests lead to superfluous requests from the mid-tier to the origin, and significant network traffic. In some cases, cache fetch bandwidth to the origin may outweigh response traffic from the mid-tier to the CDNs, just to keep up with revalidation requests.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
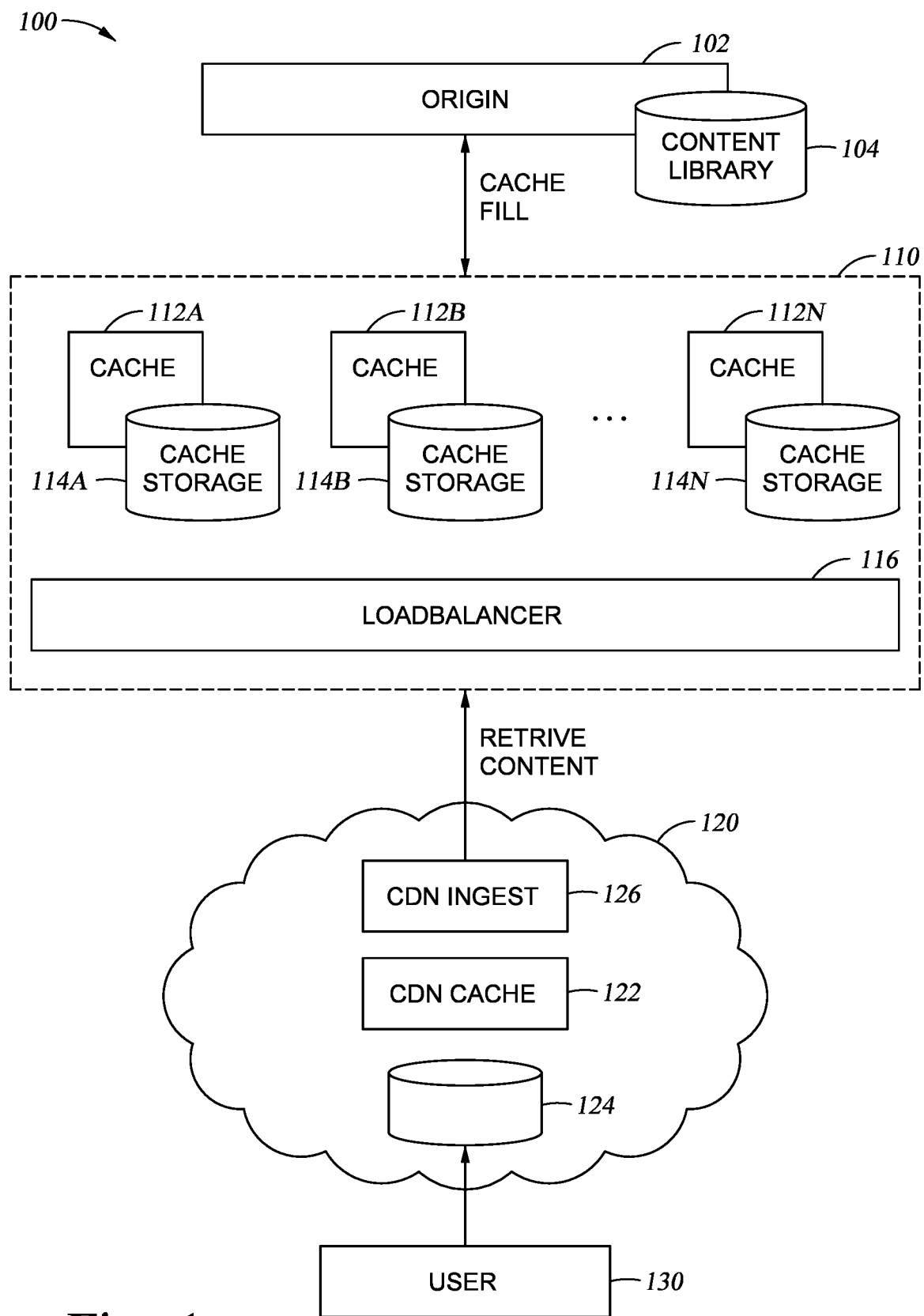
FIG. 1 is a block diagram illustrating a system for content delivery using a communication network, according to at least one embodiment.

The present disclosure relates, in one or more embodiments, to storage efficient delivery of content over communication networks. As discussed above, a CDN can transmit frequent revalidation requests, relating to an item of content, to a mid-tier server. These revalidation requests can result in cache misses, at the mid-tier cache, and the mid-tier server can respond by retrieving the content from an origin, storing the content in the mid-tier cache, and responding to the revalidation request using the retrieved content (e.g., determining whether the content stored at the CDN cache has been modified at the origin, using the content retrieved from the origin). If the content stored at the CDN cache has not changed, this results in significant network traffic, and burden on the origin, from excess requests, and inefficient storage at the mid-tier cache (e.g., storage of content items to service revalidation requests, rather than to service content requests).

In an embodiment, this can be improved by a mid-tier server retrieving, in some circumstances, only object freshness metadata from the origin, rather than full content, to address revalidation requests. For example, on receipt of a revalidation request (e.g., a conditional HTTP GET), a mid-tier server can determine that the requested content is not in cache, and can then retrieve from the origin, and store in the cache, only object freshness metadata (e.g., Etag and Last-Modified information). Where the content has not changed at the origin, object freshness metadata is sufficient to satisfy the CDN's revalidation request. The mid-tier server can respond to further checks based on the cached metadata. If the content changes (e.g., the Etag checksum no longer matches the content or the last-modified information indicates the content has changed), then the mid-tier server requests a full copy (including the content body) of the content object from the origin. As described herein, a "content body" may also be referred to as "content itself", as it may refer to the actual contents of media that may be requested by users 130 (e.g., viewers of the content), such as the media content for a particular media title.

In an embodiment, a mid-tier server conditionally determines whether to respond to a revalidation request, and a cache miss, by retrieving full content and metadata or only object freshness metadata. As discussed above, in some circumstances it can be beneficial to retrieve, and cache, only object freshness metadata. In other circumstances, however, it can be beneficial for the mid-tier server to retrieve and cache full content, even where the content has not changed at the origin. For example, revalidation requests from CDNs can assist a mid-tier server in keeping popular content in the mid-tier cache, to service future content requests (e.g., from other CDNs). Revalidation requests from CDNs indicate to a mid-tier cache which content is popular among users and should therefore be maintained in cache for future requests. A mid-tier server that responds to revalidation requests by caching only object freshness metadata could, in an embodiment, fail to cache popular content and fail to protect the origin from requests for popular content.

As discussed further below, one or more logical processes can be used to determine when the mid-tier server should cache the full content, and when it should cache just the object metadata. This both protects the origin from excessive requests for full content (e.g., ensuring that popular content is cached at the mid-tier) and reduces the load required to handle revalidation requests (e.g., by storing only the object metadata, for less popular content).

FIG. 1 is a block diagram illustrating a system 100 for content delivery using a communication network, according to at least one embodiment. The system 100 includes an origin 102 and a content library 104. In an embodiment, the content library 104 is accessible at the origin 102 (e.g., stored locally at the origin or accessible at the origin from a networked storage location). Further, in an embodiment the content library 104 includes a complete catalog of content assets to be provided to users 130 (e.g., a complete copy of all assets for a streaming media service). In an embodiment, the users 130 may be viewers of visual content, such as videos, images, visual renderings, and text. Alternatively, or in addition, the users 130 may also be consumers of other forms of content, and the content referred to herein may also be audio content with no visual content.

In one embodiment, the system 100 can include a single origin 102 and a single content library 104 (e.g., storing a complete copy of the content assets). Alternatively, the system 100 can include multiple origins 102 and multiple content libraries 104. In an embodiment, where the system 100 includes multiple origins 102 and multiple content libraries 104, each content library includes a complete copy of the content assets.

The system 100 further includes a mid-tier cluster 110. The mid-tier cluster 110 includes a number of caches 112A, 112B, through 112N. In an embodiment, each cache 112A-N includes a corresponding cache storage 114A-N. For example, the cache 112A includes a cache storage 114A, the cache 112B includes a cache storage 114B, the cache 112N includes a cache storage 114N, etc. Further, the mid-tier cluster 110 includes one or more load balancers 116.

In an embodiment, the mid-tier cluster 110 shields the origin 102 from high load and bursts of traffic. For example, the caches 112A-N can have less storage than the origin 102, and may not store a complete copy of all content assets. In an embodiment, the caches 112A-N are optimized for streaming and can deliver more traffic than the origin 102.

In one embodiment, each mid-tier cluster 110 corresponds with an origin 102 (e.g., if the system 100 includes multiple origins 102 it includes the same number of mid-tier clusters 110). Alternatively, the system 100 includes multiple mid-tier clusters 110 for each origin 102 (e.g., more mid-tier clusters 110 than origins 102). As another alternative, the system 100 can include fewer mid-tier clusters 110 than origins 102 (e.g., multiple origins 102 can correspond with the same mid-tier cluster).

In an embodiment, the mid-tier cluster 110 services requests from a content delivery network (CDN) 120. If the mid-tier cluster 110 receives a request for content not currently in storage (e.g., not stored in any of the caches 112A-N), the mid-tier cluster 110 requests a cache fill from the origin 102.

In an embodiment, the CDN 120 performs last-mile caching and content delivery to users 130 (e.g., subscribers to a streaming service). The CDN 120 provides last-mile caching by maintaining a CDN cache 122 for recently viewed material (e.g., by users 130). The CDN 120 uses the CDN cache 122 to quickly provide frequently requested content to the users 130, avoiding repeated requests for content from the mid-tier cluster 110 (or the origin 102). For example, the CDN 120 can be a public CDN operated by a third-party entity not associated with the entity, or entities, that maintain the mid-tier cluster 110 and origin 102. Alternatively, the CDN 120 can be operated by the same entity, or entities, that maintain the mid-tier cluster 110 and origin 102. In an embodiment, the CDN 120 receives a request for content form a user 130. If the content is maintained in the CDN cache 122 (including the associated CDN cache storage 124), the CDN 120 returns the content to the user 130.

If the requested content is not maintained in the CDN cache 122, the CDN requests the content from the mid-tier cluster 110. The CDN 120 includes a CDN ingest service 126 which ingests content received from the mid-tier cluster (e.g., stores the content, if appropriate, in the CDN cache 122 and provides the content to the requesting user 130).

In an embodiment, content stored at the CDN 120 (e.g., stored in the CDN cache 122) has an associated expiration time (e.g., a time-to-live (TTL)). If the CDN 120 receives a request for content stored in the CDN cache 122, but which has expired, the CDN 120 performs a revalidation request on the content (e.g., a request to the mid-tier cluster 110) to determine whether the content has changed. This is discussed further below. If the content has not changed, the CDN 120 extends the expiration time and delivers the cached content to the user. If the content has changed, the CDN 120 receives the content (e.g., from the mid-tier cluster 110), stores the content (e.g., in the CDN cache 122, as appropriate), and delivers the content to the user 130.

In the illustrated embodiment of FIG. 1, the mid-tier cluster 110 receives content requests from the CDN 120, which delivers content to the users 130. The system 100 includes two layers of caching: mid-tier cluster 110 includes a cache 112A-N, and the CDN includes a cache 122. This is merely an example. The system 100 could include additional layers of caching. For example, the mid-tier cluster 110 could receive content requests from another intermediate layer (e.g., another mid-tier cluster) with another layer of caching. One or more of the techniques described below could be used in this scenario.

Figure 2:
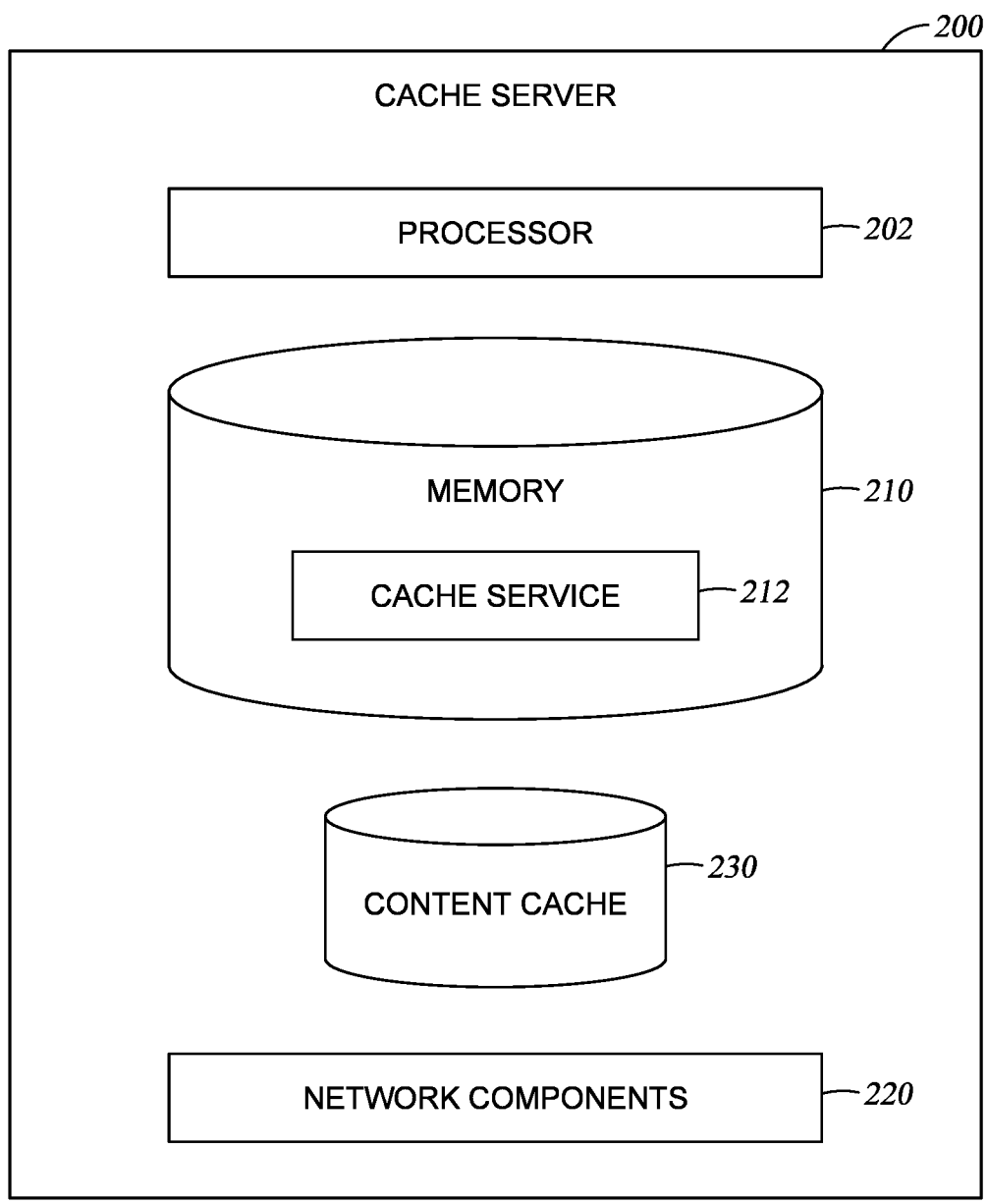
FIG. 2 is a block diagram illustrating a cache server for a system for content delivery using a communication network, according to at least one embodiment.

FIG. 2 is a block diagram illustrating a cache server 200 for a system for content delivery using a communication network, according to at least one embodiment. The cache server 200 includes a processor 202, a memory 210, network components 220, and a content cache 230. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the cache server 200 to interface with components over a network (e.g., as illustrated in FIG. 1). For example, the cache server 200 can be a part of the mid-tier cluster 110, and the cache server 200 can use the network components 220 to interface with remote storage and compute nodes using the network components (e.g., the origin 102 and the CDN 120). Alternatively, or in addition, the cache server 200 can be located in a different part of the system 100 (e.g., the origin 102, the CDN 120, or another suitable location).

The cache server 200 can interface with other elements in the system over a local area network (LAN), for example an enterprise network, a wide area network (WAN), the Internet, or any other suitable network. The network components 220 can include wired, WiFi or cellular network interface components and associated software to facilitate communication between the cache server 200 and a communication network.

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the cache server 200. The program code is generally described as various functional "applications" or "services" within the memory 210, although alternate implementations may have different functions and/or combinations of functions.

Within the memory 210, an cache service 212 facilitates retrieving content from a remote source (e.g., from the origin 102 illustrated in FIG. 1), storing content in, and retrieving content from, the content cache 230, and providing content to a remote destination (e.g., the CDN 120 illustrated in FIG. 1). This is discussed further below with regard to subsequent figures. In an embodiment, the cache service 212 stores to, and retrieves from, the cache 230 using any suitable cache algorithm (e.g., a segmented least recently used (LRU) algorithm).

Figure 3:
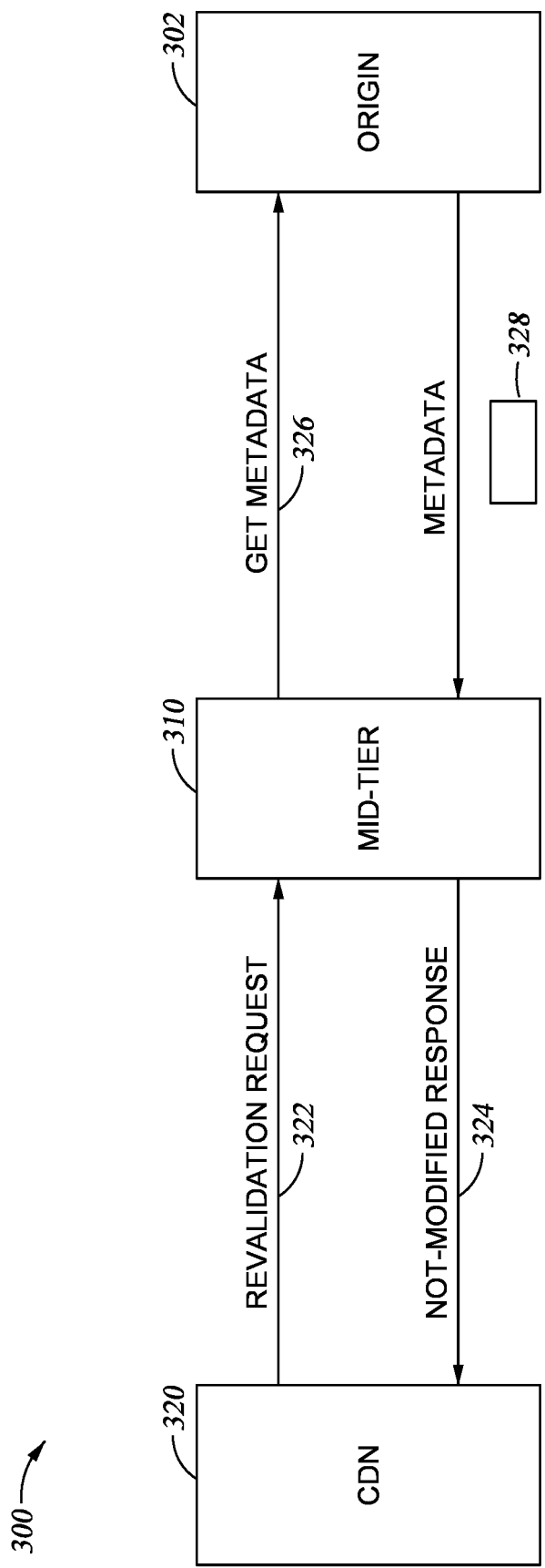
FIG. 3 illustrates a content revalidation flow in a system for content delivery using a communication network, according to at least one embodiment.

FIG. 3 illustrates a content revalidation flow 300 in a system for content delivery using a communication network, according to at least one embodiment. As discussed above, in an embodiment a CDN 320 (e.g., the CDN 120 illustrated in FIG. 1) performs periodic revalidation requests on content stored in a CDN cache (e.g., the CDN cache 122 illustrated in FIG. 1). For example, content stored in the CDN cache can include an associated expiration time (e.g., a TTL). If the content is requested by a viewer (e.g., a user 130 as illustrated in FIG. 1) and is maintained in the CDN cache but has expired, the CDN 320 can transmit a revalidation request (e.g., to a mid-tier cluster) to determine whether the content has changed since it was cached at the CDN. Alternatively, or in addition, the CDN 320 can perform intermittent revalidation requests on content stored in the CDN cache (e.g., after a specified time period passes, when the CDN is otherwise idle or less busy than usual, at a particular time of day, etc.).

In an embodiment, the CDN 320 transmits a revalidation request 322 to a mid-tier cluster 310 (e.g., the mid-tier cluster 110 illustrated in FIG. 1). For example, the CDN 320 can transmit a conditional HTTP GET request (e.g., an HTTP GET If-Modified-Since request) to the mid-tier cluster 310. As discussed below, the mid-tier cluster 310 determines whether the content has changed at the origin since it was provided to the CDN. In an embodiment, when doing so the mid-tier cluster 310 evaluates the content itself to determine whether the content has changed, at the origin, since being provided to the CDN.

If the requested content is maintained locally at the mid-tier cluster 310 (e.g., in a cache 112A-N), the mid-tier cluster 310 checks to see whether the content has changed since it was cached by the CDN 320. For example, the mid-tier cluster can compare a last-modified timestamp associated with the content maintained at the mid-tier cluster with a last-modified timestamp associated with the content maintained at the CDN. This is merely one example, and any suitable technique can be used to determine whether the content has changed (e.g., comparing a checksum value, a created timestamp, etc.). If the content has not changed, the mid-tier cluster 310 transmits a response to the CDN 320 indicating that the content has not been modified (e.g., an HTTP 304 "Not Modified" response). If the content has changed, the mid-tier cluster 310 transmits the content to the CDN 320.

If the requested content is not maintained locally at the mid-tier cluster 310 (e.g., it is not maintained in the cache 112A-N), the mid-tier cluster cannot determine whether the content has changed. The mid-tier cluster must retrieve the content, or metadata associated with the content, from an origin 302 (e.g., the origin 102 illustrated in FIG. 1). In an embodiment, as discussed further below, mid-tier cluster 310 conditionally determines whether to request from the origin 302 full content, or just metadata. If the mid-tier cluster 310 determines to request full content, it transmits an HTTP GET request to the origin 302, and receives in response a message that includes both metadata associated with the requested content object (e.g., HTTP headers) and the full content object. If the content has changed, the mid-tier cluster 310 transmits the content retrieved from the origin to the CDN 320.

Always retrieving full content objects from the origin 302, however, has some drawbacks. The mid-tier cluster 310 retrieves the full content object from the origin 302, but if the content has not changed the mid-tier cluster transmits to the CDN 320 only a not-modified response 324, and not the full content object. Because the content has not changed, the content object is retrieved from the origin 302 (i.e., to allow the mid-tier to determine that the content has not changed) but is not transmitted to the CDN 320.

In an embodiment, this can be improved by, in some circumstances, retrieving only metadata associated with the content object from the origin, rather than the full content object. The mid-tier cluster 310 transmits to the origin a request 326 for metadata associated with the content object (e.g., an HTTP HEAD request for HTTP Headers). In an embodiment, the request 326 seeks from the origin 302 only metadata for the content, which the mid-tier cluster 310 can use to determine whether the content has changed. The mid-tier cluster 310 does not request the full content object from the origin 302. The origin 302 transmits metadata 328 (e.g., HTTP headers) in response to the request 326.

Thus, in an embodiment, in response to a revalidation request the mid-tier cluster 310 conditionally retrieves only metadata 328 from the origin 302, rather than the full content object and the metadata. This can result in significant bandwidth savings and savings in compute resources (e.g., at the origin 302). For systems where content does not frequently change (e.g., streaming services with a relatively static library of content), this is a substantial improvement.

Further, as discussed below in regard to FIG. 5, in an embodiment the mid-tier cluster 310 maintains the metadata for the content in cache, rather than the complete content. This results in much more efficient storage at the mid-tier cluster 310, allowing for reduced storage capacity and allowing for a higher rate of cache hits in existing storage (e.g., because more entries can be stored since each is significantly smaller). For example, the metadata for a content object may be on the order of 5-10 KB in size, while the content object itself may be 20-30 MB in size (or larger).

As discussed above, however, in an embodiment the mid-tier server 310 does not always retrieve only metadata in response to a revalidation request, and does not always retrieve full content: the mid-tier cluster 310 conditionally selects between these options. The mid-tier cluster 310 can use one or more logical processes to conditionally determine whether to retrieve and cache the full content object, in addition to the metadata. This is discussed further in relation to FIG. 4, below.

For example, the mid-tier cluster 310 can initially maintain only object metadata in its cache, and can track the number of accesses to each metadata object (e.g., HTTP Header) in the cache. If a metadata object is accessed more than a set number of times (e.g., more than 3 times), then the content is deemed popular enough to retrieve and cache the full object in the mid-tier, rather than just the metadata. This protects the origin 302 from excessive load by maintaining popular content in the mid-tier cache. Because the CDN 320 typically maintains in its own cache content that is frequently requested (e.g., by users), a revalidation request from the CDN 320 to the mid-tier (e.g. as opposed to a full retrieval request) indicates that the content is popular enough to be maintained in cache at the CDN 320. The number of revalidation requests from a CDN 320 to the mid-tier cluster 310 can, therefore, indicate the popularity of the content. In an embodiment, the logical process used by the mid-tier server to determine whether to retrieve a full content object can be configured by a user (e.g., a system administrator) using a suitable user interface, can be set to a default value without user input, or both. This is merely one example of a logical process to determine whether to retrieve a content object. Further examples are discussed below, in relation to block 420 in FIG. 4.

Figure 4:
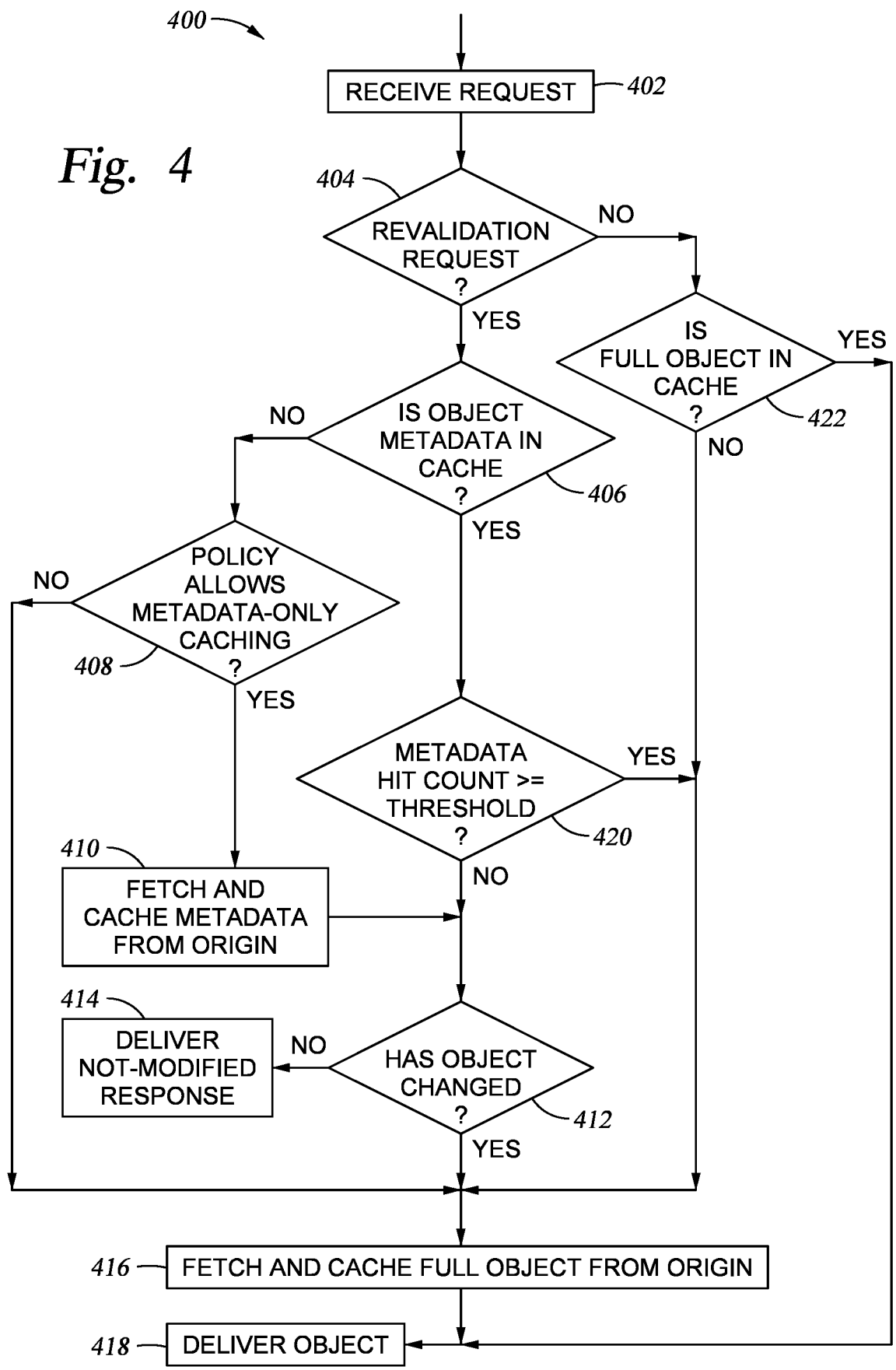
FIG. 4 is a flowchart illustrating content delivery using a communication network.

FIG. 4 is a flowchart 400 illustrating content delivery using a communication network. A cache service (e.g., the cache service 212 illustrated in FIG. 2) receives a request for content (e.g., an HTTP Get request). As discussed above, in an embodiment the cache service operates in a mid-tier cluster (e.g., the mid-tier cluster 110 illustrated in FIG. 1). In this embodiment, the cache service receives an HTTP Get request from a CDN (e.g., the CDN 120 illustrated in FIG. 1) or another suitable remote requestor (e.g., another network edge location).

This is merely one example. Alternatively, as discussed above, the cache service could receive a request for content from another layer (e.g., another mid-tier layer instead of a CDN) with its own cache. Alternatively, or in addition, the cache service could operate on an edge location (e.g., in the CDN 120 illustrated in FIG. 1) or an origin location (e.g., the origin 102 illustrated in FIG. 1). Further, an HTTP Get is merely one example of a suitable request for content. Any suitable request (e.g., another type of HTTP request, another network request, an Application Programming Interface (API) call, a remote procedure call (RPC), etc.) can be used.

At block 404, the cache service determines whether the request is a revalidation request (e.g., a conditional HTTP Get request). If so, the flow proceeds to block 406. At block 406, the cache service determines whether object metadata (e.g., relating to the requested content) is located in a local cache (e.g., a cache 230 illustrated in FIG. 2). If not, the flow proceeds to block 408.

At block 408, the cache service determines whether a predefined policy allows for metadata only caching. In an embodiment, a user (e.g., a system administrator) can configure a policy to enable (or disable) metadata only caching. This is merely one embodiment, however, and in other embodiments block 408 may be omitted (e.g., the cache service may always allow for metadata only caching). If the cache service determines that metadata only caching is allowed, the flow proceeds to block 410. Otherwise the flow proceeds to block 416, described further below.

At block 410, the cache service fetches the metadata associated with the requested content from an origin (e.g., from the origin 102 illustrated in FIG. 1) and stores the metadata in a local cache (e.g., the content cache 230 illustrated in FIG. 2). As discussed above in relation to FIG. 3, in an embodiment a cache service (e.g., in a mid-tier cluster) can cache metadata associated with content (e.g., HTTP Header metadata) in place of the content itself. The cache service can use this metadata to respond to validation requests, instead of requiring the complete content object.

At block 412, the cache service determines whether the object has changed. For example, in an embodiment the request received at block 402 can indicate when the requested content was last validated. In an embodiment, the revalidation request can include a field indicating when the content was last validated by the requestor (e.g., when the content was last validated by the CDN). The content metadata can include a last-modified timestamp, or another suitable indicator, and the cache service can analyze the content metadata to determine whether the content has changed since it was last validated by the requestor.

If the content has not changed, the flow proceeds to block 414. At block 414, the cache service delivers a non-modified response. For example, the cache service can respond to the request received at block 402 with an HTTP 304 "Not-Modified" response. These is merely one example, and any suitable response, indicating that the requested content has not been modified, can be used (e.g., an API response, an RPC response, another suitable network message response, etc.).

Returning to block 412, if the cache service determines that the content object has changed, the flow proceeds to block 416 instead of block 414. At block 416, the cache service fetches the full content object (e.g., including the content itself in addition to the metadata fetched at block 410) from an origin (e.g., the origin 102 illustrated in FIG. 1, or another suitable source) and caches the full content object (e.g., in the content cache 230 illustrated in FIG. 2).

The flow proceeds from block 416 to block 418. At block 418, the cache service delivers the content object to the requestor (e.g., to the CDN 120 illustrated in FIG. 1). In an embodiment, the cache service delivers the full requested content object to the requestor. Alternatively, or in addition, the cache service delivers a portion of the requested content object to the requestor (e.g., followed by one or more later transmission with the remaining portions of the object).

Returning to block 406, the cache service determines that metadata for the requested content object is located in the cache (e.g., in the cache 230 illustrated in FIG. 2). The flow proceeds to block 420. The cache service determines whether the metadata hit-count is greater than or equal to a pre-determined threshold value. In an embodiment, the cache-service tracks requests for the content metadata. For example, the cache-service can track requests for the content metadata since the metadata entered the cache, over a specified duration, since a last retrieval of the full content object, etc. The number of requests is the hit-count. In an embodiment, the threshold relates to a total number of hits. Alternatively, or in addition, the threshold relates to a rate of hits (e.g., a number of hits over a given period of time). In an embodiment, the hit-count is stored along with the metadata (e.g., in the cache 230 illustrated in FIG. 2). The hit-count is cleared when the metadata is evicted from the cache (e.g., according to a cache algorithm). Alternatively, or in addition, hit-count can be stored in a separate data structure (e.g., in the cache 230 illustrated in FIG. 2, or in any other suitable location).

Further, in an embodiment, the cache service maintains a pre-determined threshold at which a full content object (e.g., as opposed to only the content metadata) will be retrieved and stored in the local cache. As discussed above, this can ensure that commonly requested content is stored in full at the cache server's local cache (e.g., the cache 230 illustrated in FIG. 2) and can be provided to requestors. Further, as discussed above, this threshold can be set by a user (e.g., a system administrator) using a suitable user interface. The threshold can also be set to a default value (e.g., 3). Further, in an embodiment the cache service can determine whether the hit-count is greater than the threshold (e.g., as opposed to greater than or equal to the threshold).

If the metadata hit-count is greater than or equal to the threshold, the flow proceeds to block 416. As discussed above, at block 416 the cache service fetches the full object from an origin and stores the full object in a local cache. If the metadata hit-count is less than the threshold, the flow proceeds to block 412. As discussed above, at block 412 the cache service determines whether the object has changed.

Use of a pre-determined hit-count threshold is merely one example of a logical process that the cache service could use to determine when to proceed to block 420 and fetch the full content object. Alternatively, or in addition, the cache service could fetch the full content object based on the load on the cache service (e.g., the load on the mid-tier cluster 110 illustrated in FIG. 1), the load on the origin, network usage statistics, etc. Further, the cache service could fetch the full content object based on the remaining capacity in the local cache (e.g., retrieving content objects more frequently if the cache has more capacity remaining), the regional popularity of the requested content (e.g., the number of plays in a given region), feedback on user experience or CDN performance, etc. These are merely example, and any suitable logical process can be used.

Returning to block 404, if the cache service determines that the request received at block 402 is not a revalidation request, the flow proceeds to block 422. At block 422 the cache service determines whether the full content object is stored in the local cache (e.g., in the cache 230 illustrated in FIG. 2). If so, the flow proceeds to block 418 and the cache service delivers the full object to the requestor (as discussed above). If not, the flow proceeds to block 416 and the cache service fetches the full content object from an origin and stores the full content object in the local cache (as discussed above).

Figure 5:
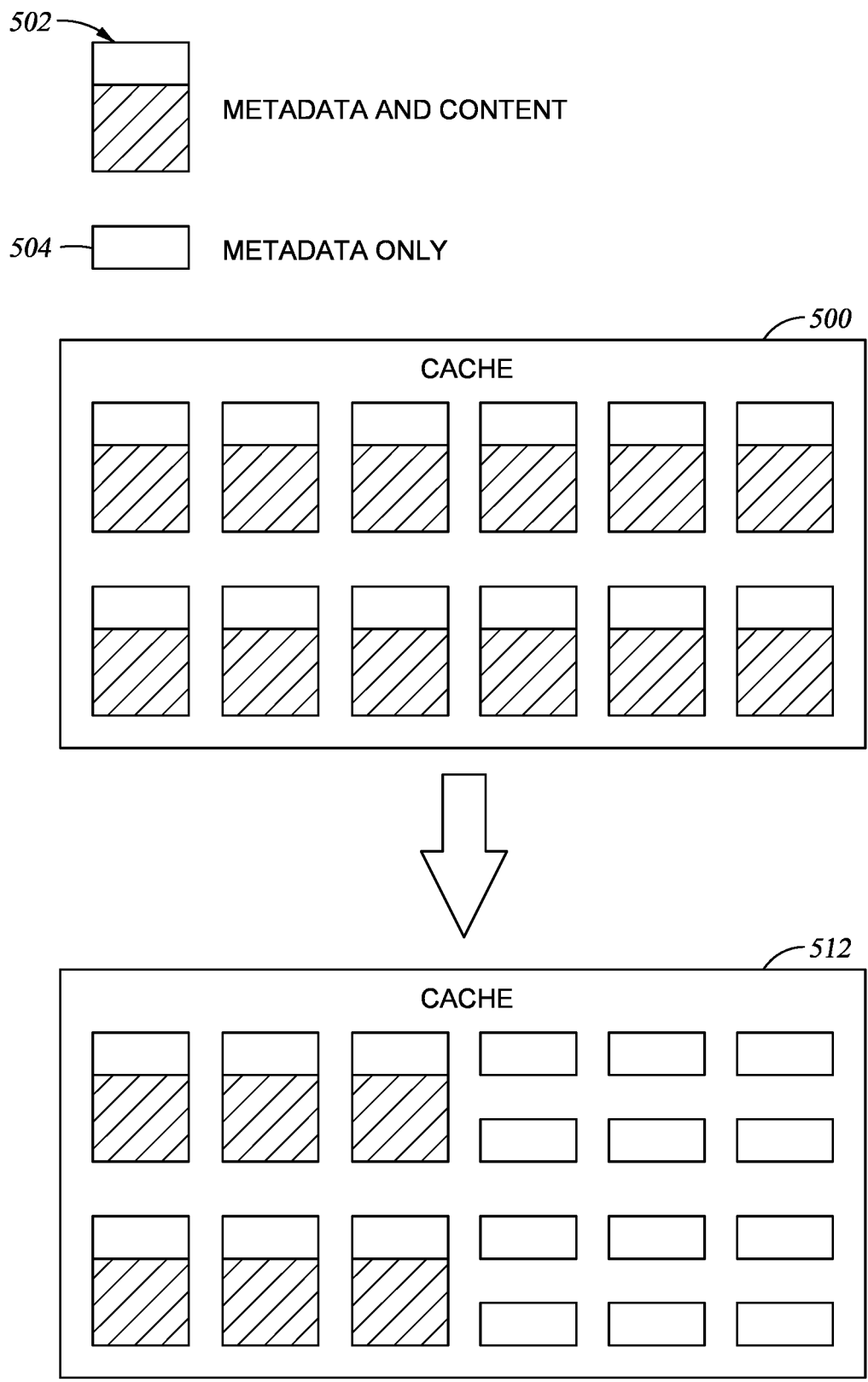
FIG. 5 illustrates a content cache in a system for content delivery using a communication network, according to at least one embodiment.

FIG. 5 illustrates a content cache 512 in a system for content delivery using a communication network, according to at least one embodiment. A traditional content cache 500 includes both metadata and content entries 502, for each content object. As discussed above in relation to FIGS. 3-4, in an embodiment this can be improved by storing a mix of metadata and content entries 502, for some content objects, and metadata only entries 504, for other content objects.

In an embodiment, this allows a cache service (e.g., the cache service 212 illustrated in FIG. 2) to respond to revalidation requests by retrieving metadata only from the cache 512, assuming the content has not changed. Further, this provides for significantly more efficient storage in the cache 512 as compared with the cache 500, because the metadata only entries 504 can be orders of magnitude smaller than the metadata and content entries 502 (e.g., which include the actual content to provide to a user).

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A processor-implemented method, comprising:
   receiving, at a first server from a requestor, a revalidation request relating to a content object;
   determining that metadata describing one or more characteristics of the content object is stored in a cache associated with the first server and that the content object is not stored in the cache, and in response:
      determining, at the first server, whether to retrieve content object data from any server based on analyzing a metric relating to retrieving the content object; and
      transmitting from the first server to the requestor, based on analyzing the metadata, a response to the revalidation request indicating that the content object is not modified.

2. The method of claim 1, wherein the requestor comprises a content delivery network (CDN), the first server comprises a mid-tier cluster, and the determining, at the first server, whether retrieve the content object from any server comprises determining whether to retrieve the content object from an origin.

3. The method of claim 1, wherein determining, at the first server, whether to retrieve the content object from any server comprises:
   determining, based on a first logical process, to store the metadata relating to the content object in the cache without a content object.

4. The method of claim 3, wherein the first logical process comprises determining that a hit-count relating to requests for the content is less than a pre-determined threshold.

5. The method of claim 4, wherein determining, at the first server, whether to retrieve the content object from any server comprises further comprises:
   determining, based on the revalidation request and the metadata, that the content object has not changed since a prior retrieval.

6. The method of claim 1, further comprising:
   receiving, at the first server from the requestor, a second revalidation request relating to a second content object;
   determining that second metadata relating to the second content object is stored in the cache associated with the first server;
   retrieving, at the first server, the second content object from a second server; and
   transmitting the second content object to the requestor.

7. The method of claim 6, further comprising:
   determining, at the first server based on a first logical process, to retrieve the second content object from the second server.

8. The method of claim 7, wherein the first logical process comprises determining that a hit-count relating to requests for the second content object is greater than or equal to a pre-determined threshold.

9. The method of claim 1, further comprising:
   receiving, at the first server from the requestor, a second revalidation request relating to a second content object;
   determining that second metadata relating to the second content object is not stored in the cache associated with the first server, and in response:
      retrieving the second metadata from a second server without retrieving the second object; and
      storing the second metadata in the cache.

10. The method of claim 9, further comprising:
    determining, based on a predefined policy, to retrieve the second metadata from the second server without retrieving the second object.

11. A system, comprising:
    a processor;
    a memory storing a program, which, when executed on the processor, performs an operation, the operation comprising:
       receiving, at a first server from a requestor, a revalidation request relating to a content object;
       determining that metadata describing one or more characteristics of the content object is stored in a cache associated with the first server and that the content object is not stored in the cache, and in response:

determining, at the first server, whether to retrieve content object data from any server based on analyzing a metric relating to retrieving the content object; and
transmitting from the first server to the requestor, based on analyzing the metadata, a response to the revalidation request indicating that the content object is not modified.

12. The system of claim 11, wherein the requestor comprises a content delivery network (CDN), the first server comprises a mid-tier cluster, and the determining, at the first server, whether to retrieve the content object from any server comprises determining whether to retrieve the content object from an origin.

13. The system of claim 11, wherein determining, at the first server, whether to retrieve the content object from any server comprises:
determining, based on a first logical process, to store the metadata relating to the content object in the cache without a content object.

14. The system of claim 13, wherein determining, at the first server, whether to retrieve the content object from any server comprises:
determining, based on the revalidation request and the metadata, that the content object has not changed since a prior retrieval.

15. The system of claim 11, the operation further comprising:
receiving, at the first server from the requestor, a second revalidation request relating to a second content object;
determining that second metadata relating to the second content object is stored in the cache associated with the first server;
retrieving, at the first server, the second content object from a second server; and
transmitting the second content object to the requestor.

16. The system of claim 15, the operation further comprising:
determining, at the first server, to retrieve the second content object from the second server, based on determining that a hit-count relating to requests for the second content object is greater than or equal to a pre-determined threshold.

17. The system of claim 11, the operation further comprising:
receiving, at the first server from the requestor, a second revalidation request relating to a second content object;
determining that second metadata relating to the second content object is not stored in the cache associated with the first server, and in response:
retrieving the second metadata from a second server without retrieving the second object; and
storing the second metadata in the cache.

18. A method comprising:
receiving, at a mid-tier cluster from a content delivery network (CDN), a revalidation request relating to a content object;
determining that metadata relating to describing one or more characteristics of the content object is not stored in a cache associated with the mid-tier cluster, and in response:
determining whether to retrieve the content object from any server based on analyzing a metric relating to retrieving the content object;
sending a request to fetch the metadata from an origin server;
receiving the metadata from the origin server; and
storing the metadata in the cache associated with the mid-tier cluster.

19. The method of claim 18, further comprising:
determining, based on a predefined policy, to retrieve the metadata from the origin server without retrieving a content body of the content object.

20. The method of claim 18, wherein the revalidation request comprises an HTTP GET message, and wherein the request to fetch the metadata comprises an HTTP HEAD message.

* * * * *

UNITED STATES PATENT AND TRADEMARK OFFICE
CERTIFICATE OF CORRECTION

| | | |
|---|---|---|
| PATENT NO. | : 11,943,315 B2 | Page 1 of 1 |
| APPLICATION NO. | : 18/157705 | |
| DATED | : March 26, 2024 | |
| INVENTOR(S) | : Eric C. Friedrich et al. | |

It is certified that error appears in the above-identified patent and that said Letters Patent is hereby corrected as shown below:

In the Drawings

On sheet 1 of 5, in Fig. 1, Line 12, reference number "116", delete "LOADBALANCER" and insert -- LOAD BALANCER --.

On sheet 1 of 5, in Fig. 1, Line 13, delete "RETRIVE" and insert -- RETRIEVE --.

In the Specification

In Column 3, Line 45, delete "112B," and insert -- 112B, --.

In the Claims

In Column 12, Line 22, in Claim 5, before "further" delete "comprises".

Signed and Sealed this
Third Day of September, 2024

Katherine Kelly Vidal
*Director of the United States Patent and Trademark Office*